No. 771,599. PATENTED OCT. 4, 1904.
A. C. BATES.
PNEUMATIC POWER WHEEL.
APPLICATION FILED DEC. 11, 1903.
NO MODEL.
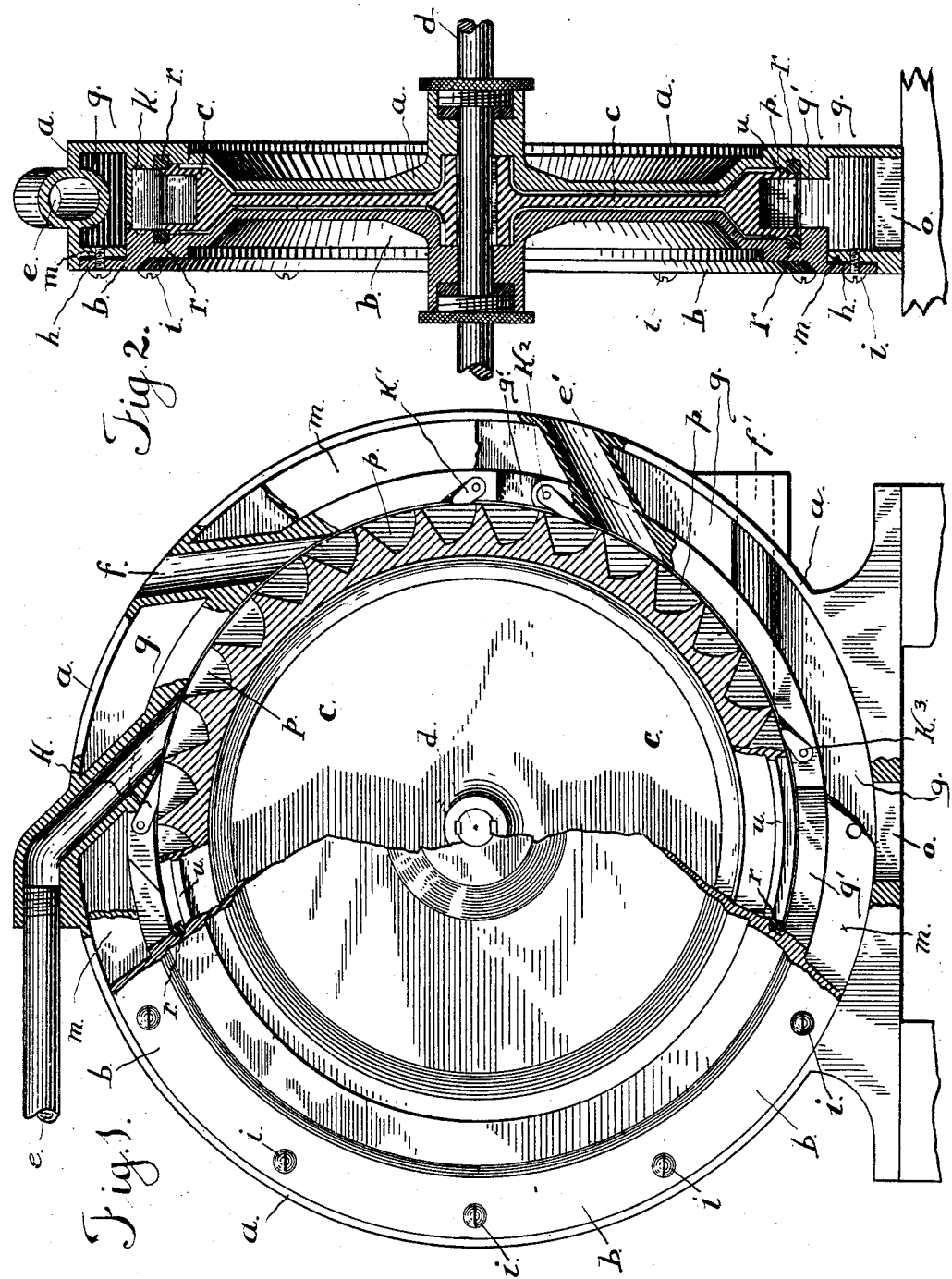
Witnesses
Arthur L. Slee.
James Spence.
Inventor
Arthur C. Bates
by Lincoln Sonntag,
Atty.

No. 771,599. Patented October 4, 1904.

UNITED STATES PATENT OFFICE.

ARTHUR C. BATES, OF OAKLAND, CALIFORNIA.

PNEUMATIC POWER-WHEEL.

SPECIFICATION forming part of Letters Patent No. 771,599, dated October 4, 1904.

Application filed December 11, 1903. Serial No. 184,824. (No model.)

*To all whom it may concern:*

Be it known that I, ARTHUR C. BATES, a citizen of the United States, residing at Oakland, in the county of Alameda and State of California, have invented certain new and useful Improvements in Pneumatic and Water-Power Wheels or Motors, of which the following is a specification.

The object of my invention is to provide an improved pneumatic and water-power wheel or motor for the operation of shafting whereby the necessity of employing belting will be obviated, and for other purposes for which a motor is used and one in which escape of air, steam, or other fluid used in the working thereof is entirely prevented except at the intended points of discharge.

My invention consists of a pneumatic and water-power wheel or motor in a case which may be made solid or in segments and adapted to be secured near shafting for the revolution thereof. The said wheel has a periphery consisting of equidistant buckets which successively come into position before a volume of compressed air or other fluid, thereby driving the same at a high rate of speed. Shafting centrally penetrating said wheel may be secured thereto by keys fitting therein, as shown in the drawings hereinafter mentioned. The air or other fluid for propelling said wheel is conducted thereto through tubes which constitute the inlets, and other tubes are provided beyond said inlets as outlets. Packing boxes or recesses containing suitable packing are novelly placed at points where escape of fluid would otherwise occur and which constitute one of the most important features of my invention. The construction of said machine is such that the buckets when in position to be acted upon by a fluid constitute valves which do not permit the passage of such fluid until the increasing pressure thereof causes the revolution of the wheel.

My invention further consists in the improvements in a wheel or motor, as above mentioned, hereinafter fully described, and particularly pointed out in the claims.

The nature and objects of my invention will be more fully understood from the following description in detail, referring to the accompanying drawings forming part hereof, and in which—

Figure 1 is a side view of my machine with its cover partly broken away to show the motor-wheel and sections of tubing for the transmission of the fluid employed, as well as other parts hereinafter referred to. Fig. 2 is a transverse section of Fig. 1.

Letters of reference as displayed show the several parts of my mechanism.

$a$ represents the body of the case, and $b$ shows the removable side or cover of the same fitting therein and secured by screws $i$. $c$ is the wheel revolving in said case whose rim is provided with buckets $p$, placed equidistantly. The said wheel revolves on the axis or shaft $d$.

$e$ $e'$ represent the inlets for steam or other fluid to the buckets, and the escape backward of the same is prevented by the surface between such buckets as contacting with the surrounding interior of the case and also by the gravity-packing $k$, which is inclosed in a cavity and forced down on the surface of the wheel to prevent loss of power in its direction. Other escape of pressure is prevented by the side or flange packings $r$, which are arranged on the interior face of the cover and the case $a$, so as to engage on side of flange $u$ on wheel $c$, as shown. $f$ $f'$ represent exhausts. Loss of pressure is further prevented by packing $K'$, as contained in a recess, as shown. The fluid remaining in the buckets is discharged at the port or opening $g'$ into the chamber $g$ and thence from the motor through the opening or discharge-port $o$, running from chamber $g$ to the exterior of the case. The operation, as mentioned, is repeated by means of the opening or inlet $e'$, the packing $k^2$, the buckets $p$, the port or exhaust $f'$, and the packing $k^3$, and the opening or discharge-port $o$. The cover rests on the packing-disk $h$, which in turn rests on the flange $m$, which is an internal flange extending inwardly from the periphery of the case $a$ on the side which is constructed to receive the said cover.

To operate the said motor, a suitable machine for the compression or expansion of air or other fluid should be selected to force a sufficient volume thereof into the inlets, and its contact successively with the buckets will cause the revolution of the shaft by reason of its attachment to the wheel, the speed of revolution or power being necessarily dependent on the amount of pressure of fluid or the size of the device. The inclosed space between the inlets and outlets constitute continuous air and water tight tubes. Blades may be substituted for the buckets, if preferred. For regulating the motion of the wheel a suitable balance-wheel should be attached to the shaft as well as a governor for the maintenance of uniformity of speed. Cocks or ordinary valves may also be applied to the inlets and outlets for reducing or increasing pressure.

One of the most important features of my invention is the arrangement for the utilization of back pressure to assist in the revolution of the wheel. In my machine the impact for the revolution of the wheel is caused in the tight passage secured through the means hereinbefore explained, and such revolution is assisted by back pressure from exhaust $f$, and, further, by such pressure through ports $g'$ as the fluid is discharged at port $o$, the pressure being exerted on the face of the buckets. An increase or decrease in the number of openings, such as shown at $o$, may be made, as it may be desired to control the back pressure.

Having thus described my invention, what I claim as new, and desire to secure by Letters Patent, is—

1. A pneumatic and water-power wheel or motor comprising a circular case, a wheel revolving in said case, said wheel having equidistant buckets on the periphery thereof, the walls of said buckets being adapted to contact with packing in the interior of said case, and said case having recesses arranged within such interior to contain packing for contact with said wheel to prevent the escape of fluid, inlets for the discharge of fluid against the walls of said buckets, and said case having ports for the escape of fluid from said buckets to the exterior of said case, ports for the escape of fluid into the chamber of said case, and ports for the entrance and escape of fluid to and from such chamber, substantially as and for the purposes described.

2. A pneumatic and water-power wheel or motor, comprising an interiorly circular case, a wheel revolving in said case, said wheel having buckets on the periphery thereof, the ends of the walls of said buckets being adapted to contact with packing in the interior of said case, and said case having recesses arranged within said interior to contain packing for contact with said wheel to prevent the escape of fluid, inlets for the discharge of fluid in said buckets, and said case having ports for the escape of fluid from said buckets to the exterior of said case, ports for the escape of fluid into the chamber of said case, and ports for the entrance and escape of fluid to and from such chamber, substantially as and for the purposes described.

3. A pneumatic and water-power wheel or motor comprising an interiorly circular case provided with a cover, a wheel revolving in said case, said wheel having equidistant depressions on the periphery thereof, the walls dividing such depressions contacting with the packing in the interior of said case, and said case having recesses arranged within such interior to contain packing to prevent the escape of fluid, inclined inlets for the discharge of fluid into said depressions, and said case having ports for the escape of fluid from said depressions to the exterior of said case, ports for the escape of fluid into the chamber of said case, and ports for the entrance and escape of fluid to and from such chamber, substantially as shown and described.

4. A pneumatic and water-power wheel or motor comprising a circular case having a cover therefor, a wheel revolving in said case, said wheel having equidistant buckets on the periphery thereof, the ends of the walls of said buckets being adapted to contact with packing in the interior of said case, and said case having recesses arranged within such interior to contain packing to prevent the escape of fluid, inlets for the discharge of fluid against the walls of said buckets, and said case having ports for the escape of fluid from said buckets to the exterior of said case, ports for the escape of fluid into the chamber of said case, and ports for the entrance and escape of fluid to and from such chamber, and arranged for utilizing back pressure in said machine, substantially as shown and described.

In testimony whereof I affix my signature in presence of two witnesses.

ARTHUR C. BATES.

Witnesses:
JAMES F. HOUGH,
L. E. M. DIEHL.